INVENTORS
WILLEM G. EINTHOVEN &
WILLEM BAAS
BY
AGENT

Sept. 26, 1967 W. G. EINTHOVEN ETAL 3,344,323
CONTROLLED RECTIFIERS WITH REDUCED CROSS-SECTIONAL
CONTROL ZONE CONNECTING PORTION
Filed July 24, 1964 4 Sheets-Sheet 3

INVENTORS
WILLEM G. EINTHOVEN &
WILLEM BAAS
BY

AGENT

INVENTORS
WILLEM G. EINTHOVEN &
WILLEM BAAS
BY
AGENT

United States Patent Office 3,344,323
Patented Sept. 26, 1967

3,344,323
CONTROLLED RECTIFIERS WITH REDUCED CROSS-SECTIONAL CONTROL ZONE CONNECTING PORTION
Willem Gerard Einthoven and Willem Baas, Nijmegen, Netherlands, assignors to North American Philips Company, Inc., New York, N.Y., a corporation of Delaware
Filed July 24, 1964, Ser. No. 384,999
Claims priority, application Netherlands, Aug. 7, 1963, 296,392
7 Claims. (Cl. 317—235)

This invention relates to a controlled rectifier comprising a semi-conductor body having four successive zones of alternating conductivity types, in which one of the outermost zones forms the emitter zone, while the adjacent zone, the control zone, comprises a section located below the emitter zone and a free or exposed section on the side of the emitter zone, a connection contact, the control contact, being provided on the said free section.

In the forward direction controlled rectifiers show two stable conditions. With increasing voltage between the outermost zones and in the forward direction, the controlled rectifier first is in a poorly conducting stable or OFF condition, in which a small substantially constant current flows through the rectifier. If the voltage reaches a particular value, the changeover or break-over voltage, the controlled rectifier reaches a readily conducting stable or ON condition in which the voltage across the rectifier suddenly decreases strongly and then the current through the rectifier increases when the voltage increases.

Controlled rectifiers can be controlled or switched from the poorly conducting condition to the readily conducting condition by means of a control current through the control contact. In this manner, by means of a small control current, a far larger current through the rectifier can be controlled. In this case, for example, the controlled rectifier may serve as an electrically controlled switch.

In practice it is desirable in many cases that the control current at which the controlled rectifier is controlled from the poorly conducting condition into the readily conducting condition, the ignition current, is small whereas the change-over voltage is high. These are contradictory requirements since in general a larger ignition current is required with controlled rectifiers with a higher change-over voltage.

It is one of the objects of the invention to render smaller ignition currents possible in a simple manner in controlled rectifiers, in particular to provide controlled rectifiers in which a high changeover voltage combined with a small ignition current is possible.

The invention is based on the recognition that control from the poorly conducting or OFF condition into the readily conducting or ON condition takes place when a particular control current density is reached in the section of the control zone located below the emitter zone and that it is sufficient when this particular control current density is reached in a restricted or small part only of the section of the control zone located below the emitter zone.

According to the invention, a controlled rectifier of the type mentioned in the introduction is characterized in that the control current in the control zone between the control contact and the section of the control zone located below the emitter zone can pass the edge facing the control contact of the section of the control zone located below the emitter zone substantially only through part of its length.

By the edge facing the control contact of the section of the control zone located below the emitter zone is to be understood in this connection that part of the edge of the section of the control zone located below the emitter zone of which any point can be connected to the control contact by means of a straight line located totally outside of the control zone section below the emitter zone.

Because the control current can pass substantially only a small part of the length of the said edge facing the control contact, at a particular control current a greater current density occurs locally in the section of the control zone located below the emitter zone, namely in the vicinity of said small part of the edge facing the control contact, than in the case the control current can easily pass the whole length of the edge facing the control contact. This means that the control from the poorly conducting condition into the readily conducting condition takes place at a smaller control current, in other words that the ignition current is smaller.

The invention is of particular importance for controlled rectifiers in which the emitter zone and the control zone have been obtained by diffusion of impurities.

If, for example, the emitter zone is obtained by alloying a material containing impurities, the interface between the emitter zone and the control zone usualy is less regular than in case of a diffused emitter zone and this has for its result that in a controlled rectifier having an emitter zone obtained by alloying, the control current may already be somewhat smaller as a result of the said irregularities, in consequence of which a measure according to the invention in such a controlled rectifier has a somewhat less great effect than in a rectifier having an emitter zone obtained by diffusion of impurities.

In an important embodiment of a controlled rectifier according to the invention, at least part of the thickness of the free or exposed section of the control zone is locally removed up to the near vicinity of the edge facing the control contact of the section of the control zone located below the emitter zone, as a result of which the control current can substantially pass the said edge only through part of its length. However, this latter is also achieved if, for example, the control zone is a zone obtained by locally diffusing an impurity into a surface of the semi-conductor body, the free section of the control zone joining the section of the control zone located below the emitter zone only over a small part of the length of the edge facing the control contact of the section of the control zone located below the emitter zone.

A further important embodiment of a controlled rectifier according to the invention is characterized in that in the free section of the control zone and at the surface of this section a diffused surface layer is provided of the same conductivity type as that of the control zone but having a larger conductivity than the part of the free section located below this surface layer, while this surface layer locally and up to the near vicinity of the edge facing the control contact of the section of the control zone located below the emitter zone is at least partly removed. The said surface layer which is low ohmic has the advantage that the control current in the free section will substantially entirely flow through this surface layer, while the free section of the control zone need only locally be removed through a thickness approximately equal to the thickness of this surface layer in order to limit the control current substantially in the remaining part of this surface layer. In this case, and in particular if an emitter zone is used obtained by dicusion of an impurity, a lower control current resistance is possible in the free section of the control zone.

Although the semi-conductor body may consist of a semi-conductor plate having any shape, a particularly efficaceous and successful embodiment according to the invention is characterized in that the semi-conductor body is a semi-conductor plate having approximately the shape of a sector of a circle, the four zones extending substantially parallel to the two side or major surfaces of the plate and the control contact being provided near the tip of the sector, the edge facing the control contact of the section of the control zone located below the emitter zone being situated at a greater distance from the tip of the sector than the control contact. Preferably, at least part of the thickness of the free section of the control zone is removed on either side of a part of the said free section extending between the control contact and the part of the control zone lying under the emitter zone.

Another important embodiment of a controlled rectifier according to the invention is characterized in that the emitter zone and the section of the control zone located under the said zone are annular, the free section of the control zone on which the control contact is provided being located inside the said annular section of the control zone, while along and up to the near vicinity of part of the inner edge of said annular section of the control zone the free section of the control zone is removed at least through part of its thickness. This embodiment is of particular importance for controlling high power. Preferably the free section of the control zone is removed through at least part of its thickness along at least half of the inner edge of the part of the control zone lying below the emitter zone.

A particularly favourable embodiment of a controlled rectifier according to the invention is that in which the emitter zone and the underlying section of the control zone have a bulge in the direction of the control contact, while the control current in the free section of the control zone can flow substantially only between the control contact and the bulge.

The controlled rectifier according to the invention may be manufactured as follows. A semi-conductor body having four successive zones of alternating conductivity types is used as the starting material, with the control zone, adjoining an emitter outermost zone, comprising a section located under the emitter zone and a free or exposed section on the side of the emitter zone. Masking is provided on part of the free section which masking adjoins a masking on the emitter zone, after which the non-masked portion of the free section, which non-masked portion extends up to the near vicinity of the edge of the section of the control zone located under the emitter zone, is removed at least through part of its thickness, for example, by etching, as a result of which a control current in the free section between a control contact provided on the masked portion and the section of the control zone located under the emitter zone can pass the edge facing the control contact of the section of the control zone located under the emitter zone substantially only through part of its length.

Preferably, also an edge portion of the emitter zone is removed, with the exception of the place where the masking provided on the emitter zone adjoins the masking provided on a portion of the free section of the control zone. As a result of this, the above bulge of the emitter zone and the section of the control zone located under the emitter zone is obtained.

Of great advantage is a method in which, before the masking is provided on a portion of the free section of the control zone, impurities of the same conductivity type as that of the control zone are diffused into the surface of the free section, as a result of which a diffused surface layer is obtained of the same conductivity type as that of the control zone and with a greater conductivity than the portion of the said free section located under this surface layer.

The emitter contact provided on the emitter zone may serve as a mask, while a separate mask joining the emitter contact may be provided on the free section of the control zone. However, during the removal of non-masked portions of the free section, irregularities may be formed at the connection of the two masks. Therefore, a preferred embodiment of the method is characterized in that the masking on the free section of the control zone and the mask on the emitter zone are provided as a whole in one operation. Preferably, before providing the mask, the emitter zone is provided with an emitter contct, while also the control contact is provided, the masking being provided on these contacts and a surrounding surface portion of the semi-conductor body.

The above-mentioned sector-shaped semi-conductor body may be obtained in a simple manner and with a minimum of losses of semi-conductor material by dividing into sectors a substantially circular semi-conductor disc having four successive zones of alternating conductivity types.

In order that the invention may readily be carried into effect, it will now be described in greater detail with reference to a few embodiments and the drawing, in which:

FIGURE 1 diagrammatically shows a perspective view of an embodiment of a controlled rectifier according to the invention, of which FIGURE 2 diagrammatically shows a plan view and FIGURE 3 diagrammatically shows a cross sectional view taken along the line III—III in FIGURE 2, while FIGURE 4 shows a part of the cross sectional view of FIGURE 3 on an enlarged scale.

FIGURE 13 shows diagrammatically a plan view of another embodiment of a controlled rectifier according to the invention, of which

Figure 1:
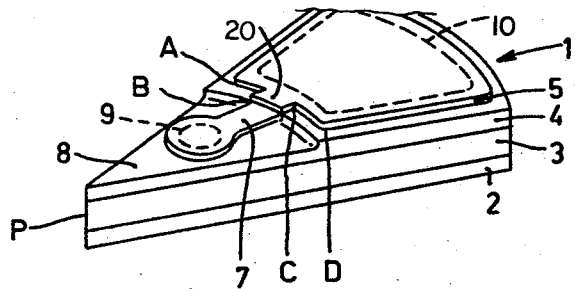

The embodiments to be described relate to controlled rectifiers comprising a semi-conductor body having four successive zones of alternating conductivity types, one of the outermost zones forming the emitter zone, the adjoining zone, the control zone, comprising a section located under the emitter zone and a free or exposed section on the side of the emitter zone on which the control contact is provided and in which, according to the invention, the control current betwen the control contact and the section of the control zone located below the emitter zone can pass the edge facing the control contact of the section of the control zone located under the emitter zone substantially only through part of its length, while in the embodiments to be described this latter effect is caused in that the free section of the control zone is removed, at least through part of its thickness, locally and up to the near vicinity of the edge facing the control contact of the section of the control zone located below the emitter zone.

In the first embodiment to be described (see FIGURES 1, 2 and 3) the semi-conductor body consists of a semi-conductor plate 1 having approximately the shape of a sector of a circle, the four zones 2, 3, 4 and 5 extending substantially in parallel with the two side surfaces of the plate 1 and the control contact 9 being provided near the tip P of the sector, the edge (A, B, C, D) of the section 6 of the control zone 4 located below the emitter zone 5 and facing the control contact 9 being located at a greater distance from the tip P than the control contact 9.

The free or exposed section (7, 8) of the control zone 4 is removed through part of its thickness on both sides of a part 7 of the free section (7, 8) extending between the control contact 9 and the section 6 of the control zone 4 located below the emitter zone 5. The free section (7, 8) consequently comprises a thin portion 8 and a thick portion 7 and the control current in the free section (7, 8) will substantially flow through the thick portion 7 and only pass the portion (B, C) of the length of the edge (A, B, C, D). As a result of this, at a given control current the control current density is locally larger in the section 6 of the control zone 4 lying below the emitter zone 5, namely in the proximity of the edge portion (B, C), than in case the control current can easily pass the whole edge (A, B, C, D) facing the control contact 9. As already explained, this has for its result that the controlled rectifier can be switched from the poorly conducting condition into the readily conducting condition by means of smaller control currents, which is of importance in particular for controlled rectifiers with high change-over voltages.

Actually, in known types of controlled rectifiers the ignition current (the control current at which switching into another stable condition takes place) generally increases when the change-over voltage increases, as a result of which it is especially of importance for types having a high change-over voltage, to decrease the ignition current and thereby extend the possibilities of application or even render the application possible.

It is noted that the emitter zone is provided with an emitter contact 10, for clearness' sake shown in broken lines in FIGURE 1 as also the control contact 9, while the lower zone 2 is provided with a connection contact 11.

Figure 3:
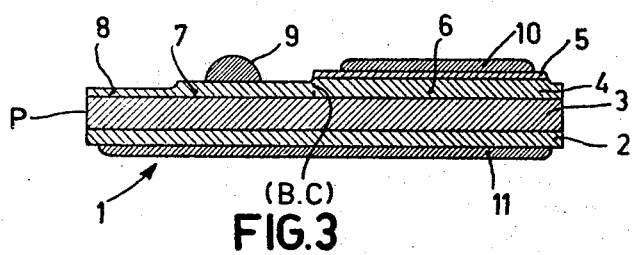

The free section (7, 8) of the control zone 4 is preferably provided with a surface layer 16 (see FIGURE 4, in which a part of the cross-sectional view shown in FIGURE 3 is shown on an enlarged scale) having a greater conductivity than the portion 17 located below the layer 16 and being of the same conductivity type as this underlying portion 17. This surface layer 16 being locally and up to the near vicinity of the edge (A, B, C, D) facing the control contact 9 of the section 6 of the control zone 4 located below the emitter zone at least partially removed, that is to say the surface layer 16 forms no or substantially no part of the thin portion 8 of the free section (7, 8) of the control zone 4.

The surface layer 16 has the advantage that a low control current resistance in the free part of the control zone can be obtained by means of this layer, while during the manufacture the free section need to be removed locally only over a thickness approximately equal to the thickness of this surface layer to limit the control current substantially in the remaining part of the surface layer.

It is noted that it is not necessary for the free section (7, 8) to comprise a thin portion 8. The free section may also locally be removed over its entire thickness, as a result of which the thin section 8 is not present.

The emitter zone 5 comprises a bulge 20 in the direction of the control contact 9. As a result of this the section 6 of the control zone 4 located below the emitter zone 5 also comprises such a bulge. The control current will flow substantially between the control contact 9 and the bulge of the section 6 of the control zone 4 located below the emitter zone 5, which appears to have a favourable influence on the properties of the controlled rectifier.

Now an embodiment will be described of a method of manufacturing the controlled rectifier described, in which also data regarding dimensions, materials and the like of the controlled rectifier will be stated.

Figure 5:
FIGURES 5, 6, 7, 8 and 11 show diagrammatical cross sectional views of a semi-conductor body in various stages of manufacturing a controlled rectifier according to the preceding figures, in which FIGURES 9 and 10 diagrammatically show a plan view of the semi-conductor body shown in FIGURE 8 and FIGURE 11 respectively, FIGURE 11 showing a cross sectional view taken on the line XI—XI in FIGURE 10.
Figure 6:
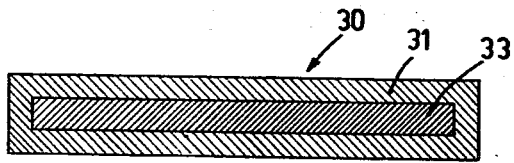

Aluminum is diffused into the surfaces of an n-type silicon wafer 30 (FIGURE 5) having a diameter of approximately 18 mm., a thickness of approximately $250\mu$ and a resistivity of approximately 20 ohm-cm. For this purpose the wafer 30 is embedded in a powdered mixture of aluminum oxide and silicon and maintained at a temperature of approximately 1215° C. for approximately 6 hours in a hydrogen atmosphere. A p-type zone 31 (FIGURE 6) having a thickness of approximately $36\mu$ and a surface concentration of approximately $10^{18}$ aluminum atoms per cm.$^3$ is then obtained while the inner zone 33 maintains the original n-type conductivity of the wafer 30.

Figure 7:
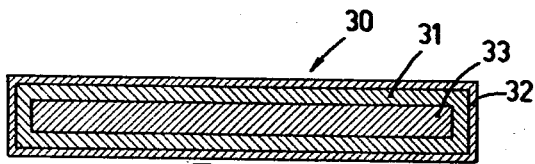

An n-type zone 32 (FIGURE 7) is diffused into the p-type zone 31. For this purpose, the wafer 30 is kept at a temperature of approximately 1210° C. for approximately 3 hours in a dry oxygen atmosphere, while in the proximity of the wafer 30 a quantity of $P_2O_5$ is kept at approximately 250° C. As a result of this the n-type zone 32 is obtained having a surface concentration of approximately $10^{20}$ phosphorus atoms per cm.$^3$ and a thickness of approximately $14\mu$.

Figure 8:
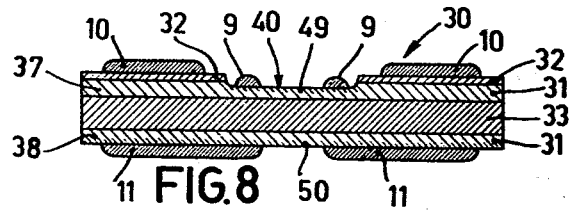
Figure 9:
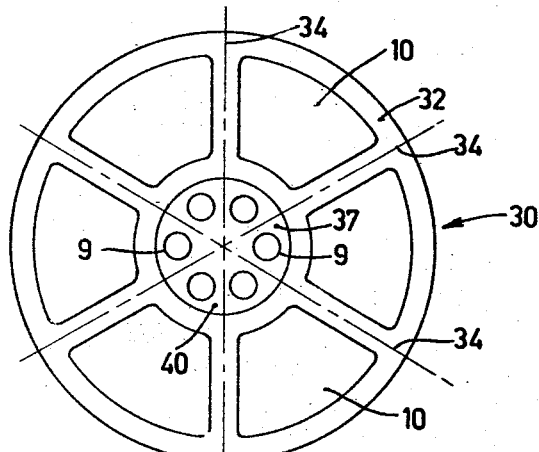

In a manner normally used in the semi-conductor technology, for example, by means of masking and etching technologies, the zones 31 and 32 are etched away at the edge of the wafer 30, the zone 32 being removed in addition on the lower side of the wafer 30. In addition, a circular part having a diameter of approximately 7 mm. of the zone 32 is removed on the upper side of the wafer 30, as a result of which a circular surface part 40 of the zone 32 becomes available. Then the configuration as shown in FIGURES 8 and 9 is obtained (the zone 31 being divided into zones 37 and 38). The wafer 30 has a diameter, for example, of approximately 17 mm.

Now the wafer 30 may be divided, for example, into six sectors along the lines 34, as a result of which sector-shaped semi-conductor bodies 40 (see FIGURES 10 and 11) are obtained having four successive zones 2, 3, 4 and 5 of alternating conductivity types. The zone 4, the control zone, adjoining the outermost zone 5, which forms the emitter zone, comprises a section 6 located below the emitter zone and a free section 35. The division into sectors may be carried out, for example, by sawing.

Then part of the free section 35 is provided with a mask which adjoins a mask provided on the emitter zone 5, after which the non-masked portion of the free section 35, which non-masked portion extends up to the near vicinity of the edge of the section 6 of the control zone 4 located below the emitter zone 5, is removed at least through part of its thickness, for example by etching, as a result of which a control current between a control contact provided on the masked portion and the section 6 can pass the edge of the section 6 of the control zone 4 located below the emitter zone and facing the control contact substantially only through a part of its length.

Preferably, the mask on the emitter zone 5 and the free section 35 is provided as a whole 36 (shaded in FIGURE 10) as will be described below.

Figure 10:
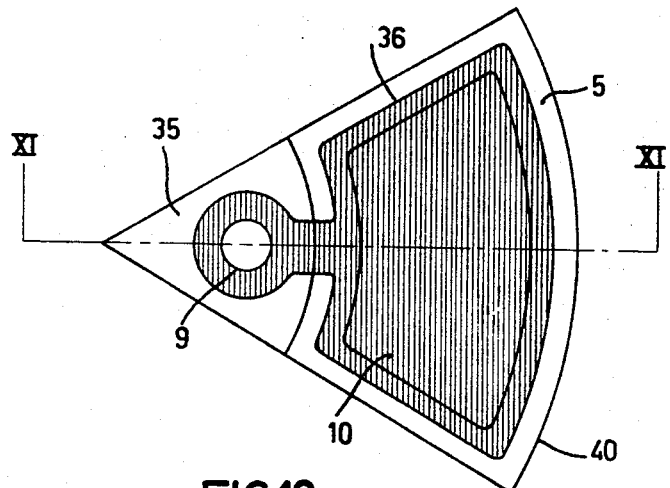

Before the mask 36 is provided, the emitter contact 10 and also the control contact 9 are provided, while the mask 36 is provided on these contacts and a surrounding surface portion of the semi-conductor body 40 as is shown in FIGURE 10.

The mask 36 does not quite reach the edge of the emitter zone 5, so that also an edge portion of the emitter zone 5 may be removed with the exception of the place where the mask on the emitter zone 5 joins the mask on the free section 35.

The mask 36 consists, for example, of a wax such as apiezon wax, which can be removed again by means of, for example, toluene.

Figure 11:
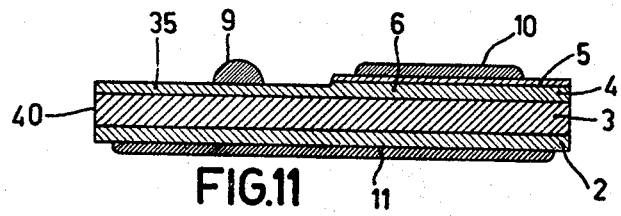

The emitter contact 10 and also the control contact 9 may already be provided on the wafer 30 (FIGURES 8 and 9) as well as the contacts 11 on the lower zone 38 in FIGURE 8 (the zone 2 in FIGURE 11).

Figure 2:
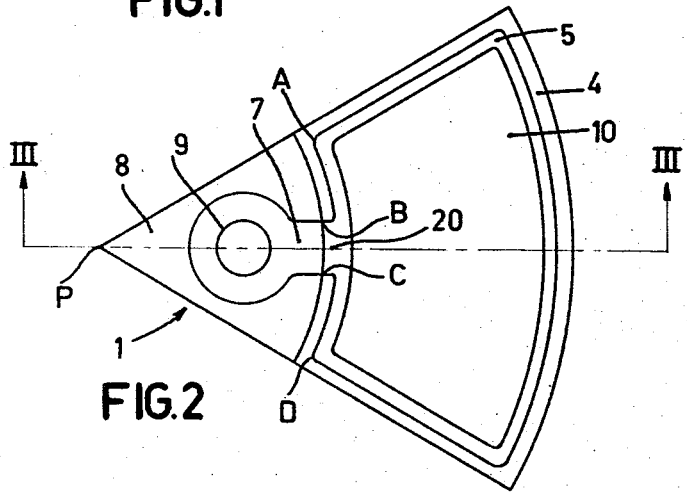
Figure 4:
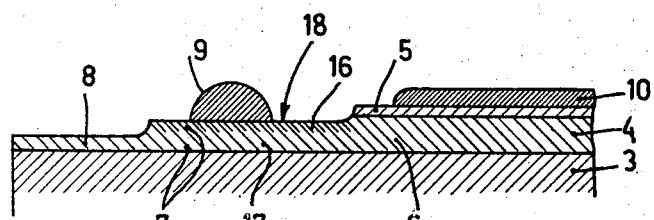

The non-masked portion of the free section 35 is now etched away through part of its thickness while also an uncovered edge portion of the emitter zone 5 is etched away in an etching agent, for example, consisting of 1 part of hydrofluoric acid (48%) to 25 parts of nitric acid (65%) for approximately 3 minutes, after which the configuration is obtained as shown in FIGURES 1–3. However, the surface layer 16 described with reference to FIGURE 4 is not present.

Such a surface layer is preferably present and may be obtained in a simple manner by diffusing, before the mask 36 (FIGURE 10) is provided, impurities of the same conductivity type as that of the control zone 4 into the surface of the free section 35 of the control zone 4. This diffusion advantageously takes place already in the free surface 40 (FIGURES 8 and 9) of the zone 37 before the contacts 9 are provided.

For example, gallium is diffused into the surface 40. For this purpose the wafer 30 is provided on a layer of a powdered mixture of aluminum oxide and silicon contaminated with gallium, while in the proximity of the wafer 30 also a quantity of gallium is available. The gallium and the wafer 30 are heated to a temperature of approximtaely 1190° C. for approximately 3 hours in a dry hydrogen atmosphere. Gallium diffuses into the surface 40 and causes there a surface layer 49 having a conductivity greater than the remaining part of the zone 37 but of the same conductivity type. The powdered silicon and aluminum oxide form silicon vapour and aluminum vapour, as a result of which substantially no silicon evaporates from the silicon wafer 30 and in addition substantially no aluminum diffuses out of this wafer. During this diffusion treatment a separate masking of the zone 32 has appeared to be superfluous.

A low resistance surface layer 50 is obtained in the zone 38 also by diffusion on which layer the contacts 11 may advantageously be provided.

The contacts 9, 10 and 11 consist, for example, of lead having approximately 0.1% by weight of nickel which is alloyed for approximately 3 minutes at approximately 380° C. in a dry hydrogen atmosphere and in which a flux consisting of ammonium fluoride vapour may be used.

Figure 12:
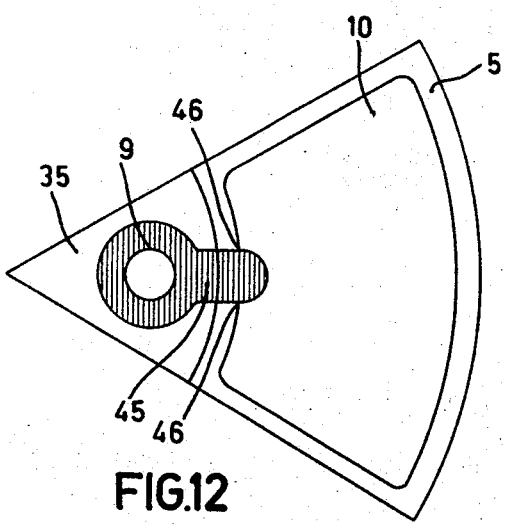
FIGURE 12 shows a plan view of the semi-conductor body shown in FIGURE 11 with a somewhat modified mode of manufacturing.

It is noted that the emitter contact 10 may also serve as a mask of the emitter zone 5. In that case it is necessary only to provide on the section 35 a mask 45 (see FIGURE 12) joining the contact 10. However, in this case the possibility exists that undesired etching pitches occur there where the mask 45 reaches the emitter contact 10, in particular at the points 46, for which reason a mask 36 (FIGURE 10) is to be preferred.

It has been found that the resulting controlled rectifier as shown in FIGURES 1-3 has a change-over voltage of approximately 700 volts. In the poorly conducting stable state a current of only a few $\mu a$. flows, while in the readily conducting stable condition currents up to approximately 100 a. may occur. If between the contacts 10 and 11, for example, a voltage of 6 volts is applied in the forward direction, the controlled rectifier may be switched from the poorly conducting condition into the readily conducting condition by means of a control current, through the control contact 9, of approximtaely 10 ma. In the controlled rectifier as shown in FIGURES 10 and 11, thus before the local etching away of the section 35, it has been found that under the same conditions a control current of approximately 30 ma. is necessary. It is noted that the width of the section 7 (FIGURES 1 and 2) in the proximity of that edge portion (B, C) is approximately 1 mm. As a result of the local etching away of the free section of the control zone a decrease of the control current is obtained in the present embodiment to approximately 30% of its original value.

It is noted that the mask 36 (FIGURE 10) may also be provided already on the wafer 30 (FIGURES 8 and 9). In that case the free section of the control zone of the six unseparated rectifiers may be locally etched away in one operation.

Figure 13:
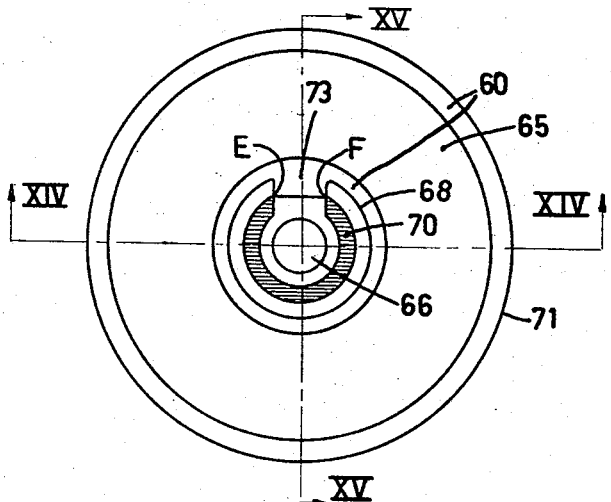
Figure 14:
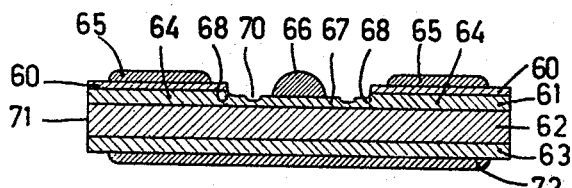
FIGURES 14 and 15 show diagrammatic cross sectional views taken along the line XIV—XIV and XV—XV respectively in FIGURE 13.
Figure 15:
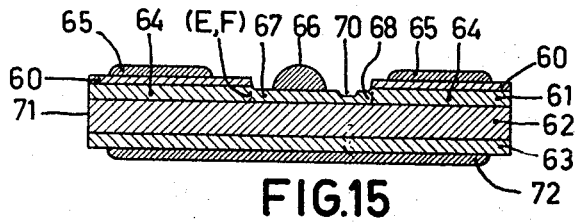

FIGURES 13, 14 and 15 show a different important embodiment of a controlled rectifier according to the invention, in which an emitter zone 60 and an underlying portion 64 of a control zone 61 are annular. The free portion 67 of the control zone 61 on which the control contact 66 is prvided lies within the annular portion 64. Along and up to the near vicinity of part of the inner edge 68 of the annular portion 64, the free portion 67 of the control zone 61 is removed through part of its thickness, as a result of which the groove 70 is formed.

The free portion 67 of the control zone 61 is removed through part of its thickness preferably at least along half of the inner edge 68 of the portion 64 of the control zone 61 located below the emitter zone.

It is noted that the groove 70 may extend in the zone 62. As a result of the presence of the groove 70, the control current between the control contact 66 and the portion 64 of the control zone 61 located below the emitter zone 60 will substantially pass only the portion (E, F) of the edge 68, as a result of which in the part 64, namely near the portion (E, F) of the edge 68, a greater control current density will occur than with the same control current in the case the groove 70 is not present and the control current can easily pass the whole edge 68. The presence of the groove 70 thereby renders control of the rectifier by means of smaller control currents possible. In the present embodiment the groove 70 easily renders a five times smaller control current possible.

The semi-conductor body 71 which, for example, again consists of silicon, comprises the four successive zones 60, 61, 62 and 63 of alternating conductivity types, while the emitter zone 60, as in the preceding example, comprises a bulge 73 in the direction of the control contact 66.

The emitter zone 60 is provided with an annular emitter contact 65, while on the zone 72 a circular contact 72 is provided. The contacts 65, 66 and 72 may again consist of lead with 0.1% by weight of nickel.

The diameter of the semi-conductor wafer 71 is approximately 16 mm., for example, while the diameter of the circular edge 68 is 2.5 mm., for example.

The controlled rectifier shown in FIGURES 13, 14 and 15 may otherwise be manufactured entirely in a similar manner as was described with reference to the preceding example.

Figure 16:
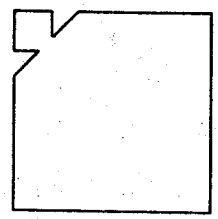
FIGURE 16 shows a plan view of a semi-conductor plate suitable for a further embodiment of a controlled rectifier according to the invention.

It may be clear that the invention is not restricted to the embodiments described and that many variations are possible for those skilled in the art without leaving the scope of the invention. For example, instead of by diffusion of impurities, the emitter zone may be obtained, for example, in a manner normally used in the semi-conductor technology by alloying a material containing impurities. As already explained, the emitter zone and the control zone, however, preferably consist of diffused zones, which means a graded impurity concentration in a direction perpendicular to the junction with the higher concentration at the side from which the diffusion takes place, the upper side of the devices shown in the drawing. It is noted that one or more of the successive zones of alternating conductivity types may also be obtained by growing semi-conductor layers on a carrier body, for example by depositing semi-conductor material from the gas phase on to a carrier body. For a ready heat dissipation it is of advantage when the semi-conductor body in a direction from the emitter zone towards the opposite outermost zone has a substantially increasing diameter, while the said opposite zone with the contact provided thereon (11 in FIGURE 3 and 72 in FIGURE 15) is attached to a heat-conducting carrier. In other words, instead of a substantially rectangular cross-section as shown, for example, in FIGURES 3, 14 and 15, the semi-conductor body, for a ready heat dissipation, preferably has a cross-section approximately in the form of a trapezium, the emitter zone being located on the shorter of the two parallel sides. Further it is not necessary for the semi-conductor body to be a semi-conductor plate substantially in the form of a sector or a circle, but this plate may have any form. For example, the plate may assume the form of a square, the control contact being provided in the proximity of the corner. If the semi-conductor plate comprises notches in the proximity of said corner, as shown in FIGURE 16, it is not necessary for the free section of the control zone to be provided to be locally removed at least through part of its thickness, since the said notches can already cause the desired effect. The semi-conductor body need not consist of silicon but may consist of a different semi-conductor material, for example, germanium, it being recommended to adapt the impurities and contact materials to be used to this semiconductor material in a manner commonly used in the semi-conductor technology.

What is claimed is:

1. A controlled rectifier comprising a semiconductive body having four successive zones of alternating conductivity type forming three p-n junctions with one of the outermost zones constituting an emitter zone and the zone adjacent thereto constituting a control zone, said control zone having a first portion underlying the emitter zone and a second juxtaposed exposed portion adjacent the emitter zone, an emitter contact on the emitter zone and a control contact on the exposed second portion of the control zone and spaced from the first portion, the peripheral adge of the said first portion facing the control contact having a given length and a given cross-sectional area, the bulk of the portion of the second control zone portion connected to the said first portion at its peripheral edge having a length and a cross-sectional area that are both significantly smaller than said given length and given cross-sectional area, respectively, whereby the control current flowing from the control contact through the second portion of the control zone to the first portion of the control zone is concentrated mainly along only a portion of the length of the first portion's peripheral edge, thereby reducing the control current required to turn-on the rectifier.

2. A controlled rectifier as set forth in claim 1 wherein both the emitter and control zones have a concentration gradient of active impurities in a direction perpendicular to the emitter-control junction with the higher concentration at the surface of the emitter and control zones remote from the remaining zones.

3. A controlled rectifier as set forth in claim 1 wherein the exposed connecting portion of the second control zone portion has a surface layer of higher conductivity than that of the adjoining exposed surfaces of the said second portion, and the portion of the second control zone portion connected to the said first portion has a length in the same direction smaller than one-half said given length.

4. A controlled rectifier as set forth in claim 1 wherein the emitter zone has a portion projecting toward the control contact and extending over the connecting portion of the second control zone portion.

5. A controlled rectifier as set forth in claim 1 wherein the emitter zone is annular and the control zone is generally circular with the control contact generally at its center and within the emitter zone, said control zone having a generally annular groove between the emitter zone and base contact defining a radial connecting portion of smaller cross-sectional area.

6. A controlled rectifier comprising a wafer-shaped semiconductive body having four layers of successive zones of alternating conductivity type forming three p-n junctions with one of the outermost zones constituting an emitter zone and the zone adjacent thereto constituting a control zone, said body being approximately sector-shaped with the four zones extending parallel to the top and bottom major surfaces, said emitter zone being located in the wide end of the sector, said control zone having a first portion underlying the emitter zone and a second juxtaposed exposed portion adjacent the emitter zone, an emitter contact on the emitter zone and a control contact on the exposed second portion of the control zone near the narrow end of the sector and between the narrow end and the emitter zone, the peripheral edge of the said first portion facing the control contact having a given length and a given cross-sectional area, the portion of the second control zone portion connected to the said first portion at its peripheral edge having portions removed forming a necked region having a length and a cross-sectional area that are both significantly smaller than said given length and given cross-sectional area, respectively whereby the control current flowing from the control contact through the second portion of the control zone to the first portion of the control zone is concentrated mainly along only a portion of the length of the first portion's peripheral edge, thereby reducing the control current required to turn-on the rectifier.

7. A controlled rectifier as set forth in claim 6 wherein both the emitter and control zones have a concentration gradient of active impurities in a direction perpendicular to the emitter-control junction, with the higher concentration at the surface of the emitter and control zones remote from the remaining zones.

References Cited

UNITED STATES PATENTS

| | | | |
|---|---|---|---|
| 2,993,154 | 7/1961 | Goldey et al. | 317—235 |
| 3,083,302 | 3/1963 | Rutz | 307—88.5 |
| 3,140,963 | 7/1964 | Svedberg | 148—33.5 |
| 3,201,596 | 8/1965 | Longini | 307—88.5 |
| 3,202,832 | 8/1965 | De Wolf | 307—88.5 |
| 3,246,172 | 4/1966 | Sanford | 307—88.5 |
| 3,263,139 | 7/1966 | Turner | 317—235 |

JOHN W. HUCKERT, *Primary Examiner.*

R. SANDLER, *Assistant Examiner.*